United States Patent Office 2,794,798
Patented June 4, 1957

2,794,798

METALLISABLE POLYAZO DYESTUFFS

Rudolf Durig, Basel, Switzerland, assignor to J. R. Geigy A.-G., Basel, Switzerland, a Swiss firm No Drawing. Application August 24, 1956,
Serial No. 605,936

Claims priority, application Switzerland
September 15, 1955

6 Claims. (Cl. 260—159)

The invention concerns substantive metallisable polyazo dyestuffs, the complex heavy metal compounds thereof, in particular the complex copper compounds, processes for their production and their use for the dyeing of cellulose material in fast, olive, olive-gray to green shades.

It has been found that valuable, substantive, metallisable polyazo dyestuffs are obtained if a monoazo dyestuff of the general Formula I

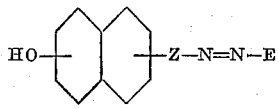

(I)

coupling in the o-position to the naphtholic hydroxyl group, is coupled in an alkaline medium with the diazo compound of a p-aminoazo dyestuff which contains an alkoxy group in the o-position to the diazotised amino group. In this coupling, the components are so chosen that the polyazo dyestuffs according to the invention contain at least one sulphonic acid group.

In this general Formula I:

Z represents the acetoacetylamino radical or the 3-methyl-5-pyrazolone radical which is bound at the amide nitrogen atom, or, in the 1-position to the naphthalene nucleus respectively and is bound at the α-carbon atom or, in the 4-position to the azo group respectively, and E represents the radical of a diazo component of the benzene series which contains a metallisable group in the o-position to the azo linkage.

Monoazo dyestuffs of the general Formula I usable according to the present invention are obtained by coupling acetoacetyl derivatives which can be coupled in the o-position to the naphtholic hydroxyl group, and 1-aryl-3-methyl-5-pyrazolones which are derived from aminonaphthols or aminonaphthol sulphonic acids with diazo compounds of the benzene series which contain a metallisable substituent in the neighbouring position to the azo group, e. g. a hydroxyl and, preferably, a carboxyl group, the coupling being performed in a weakly acid, e. g. acetic acid, neutral to weakly basic, e. g. alkali bicarbonate, agent. Examples of diazo components are: 2-aminobenzene-1-carboxylic acid, 5-nitro-, 5-acetyl- or benzoylamino-2-aminobenzene-1-carboxylic acid, 4-amino-3-carboxydiphenyl urea-4'-sulphonic acid, 4-chloro-2-aminobenzene-1-carboxylic acid, 2-amino-1-carboxybenzene-5-sulphonic acid, -5-sulphonic acid amide, -5-sulphonic acid monomethylamide, or -5-sulphonic acid diethylamide, also 2-amino-1-hydroxybenzenes which can be substituted in the usual positions for example by halogen, alkyl, alkoxy, nitro, acylamino, sulphonic acid, sulphonic acid amide, carboxyl and carboxylic acid amide groups. The 2-aminobenzene-1-carboxylic acids are preferred because they give polyazo dyestuffs according to the present invention of purer shades. The diazotised o-aminophenols are coupled advantageously with the acetoacetylamino compound. The azo components used in this case are obtained by known methods from amino-naphthols and from aminonaphthol sulphonic acids which couple in the o-position to the hydroxyl group, for example by the action of acetoacetic esters or of diketene or by diazotisation of the amino group, reduction of the diazo to the hydrazino group and condensation with acetoacetic esters or with diketene. They can be derived for example from 1- or 2-amino-7-hydroxynaphthalene, from 1-amino-7-hydroxynaphthalene-3-sulphonic acid, 2-amino-5-hydroxynaphthalene-7-sulphonic acid, 2-amino-8-hydroxynaphthalene-6-sulphonic acid, 1-amino-8-hydroxynaphthalene-6-sulphonic acid, 1-amino-8-hydroxynaphthalene-3.6- or -4.6-disulphonic acid, 1-amino-5-hydroxynaphthalene-7-sulphonic acid and, preferably from 2-amino-6-hydroxynaphthalene-8-sulphonic acid. The latter component is suitable for the production of valuable, green dyestuffs which are distinguished by the good fastness to light of the copper containing cellulose dyeings. In general, monoazo dyestuffs of the general Formula I are preferred which contain a sulphonated hydroxynaphthyl radical.

Diazotised p-aminoazo dyestuffs which, as alkoxy group in the o-position to the diazo group, can contain for example a methoxy, or carboxymethoxy group can be used for the alkaline coupling. They can contain the substituents usual in azo dyestuffs, for example, halogen, alkyl, hydroxyl, alkoxy, acylamino, nitro, carboxyl, sulphonic acid, carbamide and sulphonic acid amide groups. They are obtained by coupling the diazo compounds of any starting component desired, those for example of the benzene, naphthalene, stilbene series, or of the heterocyclic aromatic series such as for example, the thiazole, triazole or tetrazole series, with any o-alkoxyamino compounds of the benzene and naphthalene series coupling in the p-position to the amino group. Examples of starting components are: 1-aminobenzene-3- or -4-sulphonic acid, 5-amino-2-hydroxybenzene-1-carboxylic acid, 5-(3'- or 4'-aminobenzoyl)-amino-2-hydroxybenzene-1-carboxylic acid, 5-amino-2-chlorobenzene-1-sulphonic acid, dehydro-p-toluidine monosulphonic acid, 4-nitro- or 4-acetylamino- or 4-benzoylamino-4'-aminostilbene-2.2'-disulphonic acid, 4-[(4'.5':1".2"-naphtho)-1'.2'.3'-triazolyl - (2')] - 4' - aminostilbene - 2.2'.6" - trisulphonic acid. Also however, compounds containing arylazo groups such as 4-amino-2-methyl-1.1'-azobenzene-2'- or -4'-sulphonic acid, 4-amino-4'-hydroxy-3'-carboxy-1.1'-azobenzene or 4-(3"- or 4"-aminobenzoylamino)-4'-hydroxy-3'-carboxy-1.1'-azobenzene, can be used. However, if purity of shade is desired, the p-amino monoazo dyestuffs are to be preferred to the p-amino disazo dyestuffs, i. e. starting components not containing arylazo groups, are used. Examples of middle components are: 5-methyl-2-methoxy-1-aminobenzene. 2.5-dimethoxy-1-aminobenzene, 5-ethoxy-2-methoxy-1-aminobenzene, 2-methoxy-1-aminonaphthalene, 2-methoxy- or 2-carboxymethoxy-1-aminonaphthalene-6- or -7-sulphonic acid.

The p-aminoazo dyestuff is diazotised according to the usual methods, often with advantage according to the indirect method, by pouring the solution of the alkali salt, which solution contains alkali nitrite, in the cold into mineral acid.

The diazo compounds so obtained are coupled with the monoazo dyestuff of the general Formula I in an alkaline medium, for example in the presence of sodium carbonate, ammonia or magnesium oxide. Often the addition of a tertiary nitrogen base is advantageous to accelerate the coupling. For example, pyridine bases, tertiary alkanolamines or trialkylamines can be used.

The new polyazo dyestuffs correspond to the general Formula II:

$$A-N=N-B-N=N-D-N=N-E \qquad (II)$$

wherein:

A represents the radical of a diazo component of the benzene series, in particular the sulphophenyl, hydroxycarboxyphenyl, phenylcarbamylphenyl, styrylphenyl, p-phenylphenyl or arylazophenyl radicals, B represents the radical of a middle component selected from the group consisting of 3-methoxy-1.4-phenylene, 3-carboxymethoxy-1.4-phenylene, 3-methoxy-1.4-naphthylene and 3-carboxymethoxy-1.4-naphthylene radicals, D represents the radical of a naphtholic component selected from the group consisting of acetoacetylamino hydroxynaphthalene and 3-methyl-5-pyrazolonyl-(1)-hydroxynaphthalene radicals bound to the second azo group in o-position to the hydroxyl group and to the third azo group in the adjacent position to the enolisable keto group.

E represents the radical of a diazo component selected from the group consisting of o-hydroxybenzene and o-carboxybenzene radicals, said polyazo dyestuffs possessing at least one sulphonic acid group.

A preferred group of polyazo dyestuffs according to the present invention corresponds to the formula:

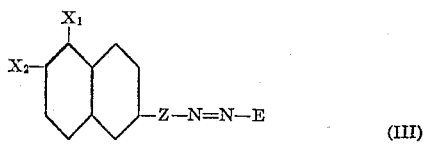

wherein one X represents the hydroxyl group and the other X represents the radical A—N=N—B—N=N— and all other symbols have the meanings given in Formulae I and II.

Of particular value because of their very good fastness to light are polyazo dyestuffs according to the present invention of the formula:

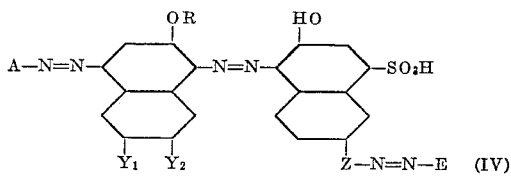

wherein one Y represents hydrogen and the other Y represents hydrogen or the sulphonic acid group, R represents the methoxy or carboxymethoxy group, and all other symbols have the meanings given in Formulae I and II.

The new metallisable polyazo dyestuffs are dark powders which, in the form of their alkali salts, e. g. the sodium, potassium, lithium, caesium or ammonium salts, dissolve in water with a grey, olive to green colour. From an aqueous solution in the warm in the presence of Glaubers salt, they draw onto cellulose material as well as textile fibres made up from natural or regenerated cellulose and are fixed wet-and-light fast on these fibres by coppering according to known methods. Provided their complex copper compounds have sufficient water solubility, which for example is the case when aminostilbene disulphonic acid derivatives are used as starting components, the new polyazo dyestuffs can be coppered in substance also by known methods and the copper-containing dyestuffs can be used for the dyeing of cellulose.

The following examples illustrate the invention without limiting it in any way. The temperatures are given in degrees centigrade and, where not otherwise stated, the parts are given as parts by weight. The relationship of parts by weight to parts by volume is as that of kilogrammes to litres.

*Example 1*

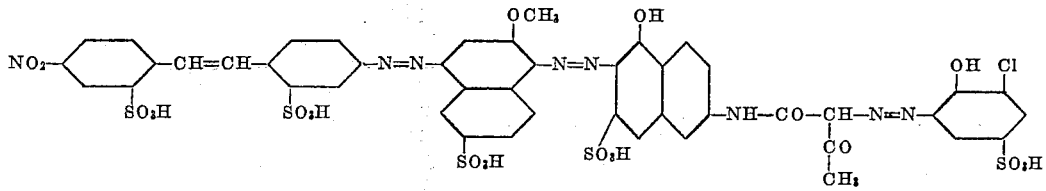

22.3 parts of 5-chloro-3-amino-4-hydroxybenzene-1-sulphonic acid are diazotised in the usual way. The clear diazo solution is gradually poured into a solution of 32.3 parts of 2-acetoacetylamino-5-hydroxynaphthalene-7-sulphonic acid and 18 parts of sodium carbonate in 700 parts of water. The dyestuff formation is complete after a few hours. The yellow monoazo dyestuff obtained is precipitated by the addition of 20% by volume of sodium chloride, isolated and washed with 15% salt water. It dissolves in water and in concentrated sulphuric acid with a yellow colour.

The 2-acetoacetylamino-5-hydroxynaphthalene-7-sulphonic acid is obtained by reacting diketene with the aqueous solution of the sodium salt of 2-amino-5-hydroxynaphthalene-7-sulphonic acid at room temperature until the primary amino group disappears.

To form the trisazo dyestuff, 66.4 parts of the aminoazo dyestuff from diazotised 4-nitro-4'-aminostilbene-2.2'-disulphonic acid and 1-amino-2-methoxynaphthalene-6-sulphonic acid are dissolved in 1500 parts of water at 15° in the presence of a little sodium carbonate. A solution of 7.6 parts of sodium nitrite in 20 parts of water is then added and the whole is poured into 42 parts of 30% hydrochloric acid and 80 parts of water at 15°. After stirring for some hours, the pale brown diazo compound is formed, whereupon it is cooled to 0–5° with ice and then poured into a soda alkaline solution of the yellow monoazo dyestuff described in the first paragraph of the present example in 1000 parts of water, which solution contains 10% by volume of pyridine. The coupling is complete in a short time and the dyestuff is precipitated by the addition of a little sodium chloride, isolated and washed.

To form the copper complex compound, the damp filter cake is dissolved in 1000 parts of water of 90°. 30 parts of sodium acetate are added, the dyestuff is precipitated with a little acetic acid and 200 parts of a one molar copper sulphate solution are immediately poured in. The whole is stirred for 3 to 4 hours at 95–100° and the dyestuff is isolated by the addition of 10% by volume of sodium chloride and filtration of the precipitate.

The trisazo dyestuff containing copper so obtained dissolves in warm water and in concentrated sulphuric acid with an olive green colour. It dyes cotton and other cellulose material direct in olive green shades which have good fastness to washing and water and excellent fastness to light. The viscose dyeings are distinguished chiefly by their excellent fastness to anti-crease processing.

Further dyestuffs are given in the following table which can be obtained in a similar manner according to Example 1 by diazotising the aminoazo dyestuffs obtained from columns 1 and 2 and coupling with the yellow monoazo dyestuffs obtained from columns 3 and 4.

| No. | Starting Component | Middle Component | Monoazo dyestuff from azo component and diazo compound of— | | Shade |
|---|---|---|---|---|---|
| 1 | NO$_2$-C$_6$H$_3$(SO$_3$H)-CH=CH-C$_6$H$_3$(SO$_3$H)-NH$_2$ | 2-amino-1-methoxy-naphthalene-sulfonic acid (OCH$_3$, NH$_2$, SO$_3$H) | OH, SO$_3$H, NHCOCH$_2$COCH$_3$ naphthol | OH, NHCOCH$_3$, NH$_2$, SO$_3$H benzene | olive. |
| 2 | NO$_2$-C$_6$H$_3$(SO$_3$H)-CH=CH-C$_6$H$_3$(SO$_3$H)-NH$_2$ | (OCH$_3$, NH$_2$, SO$_3$H) | OH, SO$_3$H, NHCOCH$_2$COCH$_3$ naphthol | OH, NH$_2$, SO$_2$NH$_2$ benzene | Do. |
| 3 | NO$_2$-C$_6$H$_3$(SO$_3$H)-CH=CH-C$_6$H$_3$(SO$_3$H)-NH$_2$ | (OCH$_3$, NH$_2$, SO$_3$H) | HO, NHCOCH$_2$·CO·CH$_3$, SO$_3$H naphthol | OH, NHCO·C$_6$H$_5$, NH$_2$, SO$_3$H benzene | Do. |
| 4 | NO$_2$-C$_6$H$_3$(SO$_3$H)-CH=CH-C$_6$H$_3$(SO$_3$H)-NH$_2$ | (OCH$_3$, NH$_2$, SO$_3$H) | SO$_3$H, OH, NHCOCH$_2$COCH$_3$ naphthol | COOH, NH$_2$ benzene | olive green. |
| 5 | NO$_2$-C$_6$H$_3$(SO$_3$H)-CH=CH-C$_6$H$_3$(SO$_3$H)-NH$_2$ | (OCH$_3$, NH$_2$, SO$_3$H) | OH, NHCO·CH$_2$·CO·CH$_3$, SO$_3$H naphthol | OH, NH$_2$, SO$_2$NH$_2$ benzene | Do. |
| 6 | NO$_2$-C$_6$H$_3$(SO$_3$H)-CH=CH-C$_6$H$_3$(SO$_3$H)-NH$_2$ | (OCH$_3$, NH$_2$, CH$_3$) | OH, SO$_3$H, NHCOCH$_2$COCH$_3$ naphthol | OH, NHCO·C$_6$H$_5$, NH$_2$, SO$_3$H benzene | Do. |
| 7 | NO$_2$-C$_6$H$_3$(SO$_3$H)-CH=CH-C$_6$H$_3$(SO$_3$H)-NH$_2$ | (OCH$_3$, NH$_2$, CH$_3$) | OH, SO$_3$H, NHCOCH$_2$COCH$_3$ naphthol | OH, Cl, NH$_2$, SO$_3$H benzene | Do. |
| 8 | NO$_2$-C$_6$H$_3$(SO$_3$H)-CH=CH-C$_6$H$_3$(SO$_3$H)-NH$_2$ | (OCH$_3$, NH$_2$, OCH$_3$) | OH, NHCO·CH$_2$·CO·CH$_3$, SO$_3$H naphthol | OH, NHCO·C$_6$H$_5$, NH$_2$, SO$_3$H benzene | olive grey. |
| 9 | triazole-bis-stilbene starting component (SO$_3$H, NH$_2$, CH=) | (OCH$_3$, NH$_2$, SO$_3$H) | OH, NHCO·CH$_2$·CO·CH$_3$, SO$_3$H naphthol | OH, Cl, NH$_2$, SO$_3$H benzene | green. |

| No. | Starting Component | Middle Component | Monoazo dyestuff from azo component and diazo compound of— | | Shade |
|---|---|---|---|---|---|
| 10 | [bis-triazole structure with SO₃H groups, linked to two aminobenzene-CH groups with SO₃H substituents] | OCH₃, NH₂ on benzene with SO₃H | OH, SO₃H, NHCOCH₂CO·CH₃ on benzene | NH₂, OH, NHCO·CH₃, SO₃H on benzene | yellow-green. |
| 11 | SO₃H, NH₂ on benzene | OCH₃, NH₂, SO₃H on benzene | OH, SO₃H, NHCOCH₂CO·CH₃ on benzene | COOH, NH₂ on benzene | green. |
| 12 | SO₃H, NH₂ on benzene | OCH₃, NH₂, SO₃H on benzene | OH, SO₃H, NHCOCH₂CO·CH₃ on benzene | COOH, NH₂, NHCO·CH₃ on benzene | Do. |
| 13 | HO₃S—benzene—NH₂ | OCH₃, NH₂, SO₃H on benzene | OH, SO₃H, NHCOCH₂CO·CH₃ on benzene | COOH, NH₂ on benzene | Do. |
| 14 | CH₃CONH—benzene—benzene—NH₂ | OCH₃, NH₂, SO₃H on benzene | OH, SO₃H, NHCOCH₂CO·CH₃ on benzene | COOH, NH₂ on benzene | olive green. |
| 15 | CH₃, NH₂ on benzene | OCH₃, NH₂, SO₃H on benzene | OH, SO₃H, NHCOCH₂CO·CH₃ on benzene | COOH, NH₂ on benzene | Do. |
| 16 | OCH₃, NH₂, SO₃H on benzene | OCH₃, NH₂, SO₃H on benzene | OH, SO₃H, NHCOCH₂CO·CH₃ on benzene | COOH, NH₂ on benzene | Do. |
| 17 | SO₃H, NH₂ on benzene | OCH₃, NH₂, SO₃H on benzene | OH, SO₃H, and pyrazolone ring (N—N=C(CH₃)—CH₂—C=O) | COOH, NH₂ on benzene | green. |

| No. | Starting Component | Middle Component | Monoazo dyestuff from azo component and diazo compound of— | | Shade |
|---|---|---|---|---|---|
| 18 | (Cl, SO₃H)-C₆H₃-NH₂ | (OCH₃, SO₃H)-naphthyl-NH₂ | (OH, SO₃H)-naphthyl-N=N-C(CH₃)=N-N-C=O-CH₂ (pyrazolone) | (COOH)-C₆H₄-NH₂ | Do. |
| 19 | (Cl, SO₃H)-C₆H₃-NH₂ | (OCH₃, SO₃H)-naphthyl-NH₂ | (OH, SO₃H)-naphthyl-N=N-C(CH₃)=N-N-C=O-CH₂ (pyrazolone) | (COOH)-C₆H₄-NH₂ | Do. |
| 20 | CH₃CONH-C₆H₄-C₆H₄-NH₂ | (OCH₃, SO₃H)-naphthyl-NH₂ | (OH, NHCOCH₂COCH₃)-naphthyl-SO₃H | (COOH)-C₆H₃-(NH₂)(NHCOCH₃) | olive green |
| 21 | NO₂-C₆H₃(SO₃H)-CH=CH-C₆H₃(SO₃H)-NH₂ | (OCH₃, SO₃H)-naphthyl-NH₂ | (HO, NHCOCH₂COCH₃)-naphthyl-(SO₃H)(SO₃H) | (OH, SO₃H, Cl)-C₆H₂-NH₂ | olive. |
| 22 | (SO₃H)-C₆H₄-NH₂ | (OCH₃, SO₃H)-naphthyl-NH₂ | (NHCOCH₂COCH₃)-naphthyl-OH | (OH, SO₃H)-C₆H₃-NH₂ | Do. |
| 23 | (SO₃H)-C₆H₄-NH₂ | (OCH₃, SO₃H)-naphthyl-NH₂ | (NHCOCH₂COCH₃)-naphthyl-OH | (OH, Cl, SO₃H)-C₆H₂-NH₂ | Do. |

*Example 2*

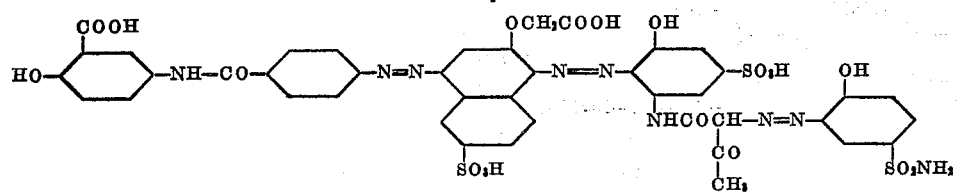

58 parts of the aminoazo dyestuff from diazotised 5-(4'-aminobenzoyl) - amino - 2 - hydroxybenzene-1-carboxylic acid and 1-amino-2-carboxymethoxynaphthalene-6-sulphonic acid are diazotised in the same manner as described in Example 1 and coupled, in the presence of pyridine, with 52.2 parts of the yellow monoazo dyestuff from 3-amino-4-hydroxybenzene-1-sulphonic acid amide and 2-acetoacetylamino - 6 - hydroxynaphthalene - 8-sulphonic acid. The isolated trisazo dyestuff dyes cotton and staple fibres in pure green shades which, on being after treated with copper salts, become very fast to washing and excellently fast to light. The viscose dyeings, in addition, are very stable to anti-crease processing.

Some dyestuffs are given in the following table which can be obtained in a very similar manner, the dyeings on cellulose materials of which also have very good fastness properties.

| No. | Starting Component | Middle Component | Monoazo dyestuff from azo component and diazo compound of— | | Shade |
|---|---|---|---|---|---|
| 1 | HO-⬡(COOH)-NHCO-⬡-NH₂ | ⬡(OCH₂COOH)(SO₃H)-NH₂ | ⬡(OH)-SO₃H / ⬡-NHCOCH₂COCH₃ | NH₂-⬡(COOH)-NH·CO·CH₃ | olive. |
| 2 | HO-⬡(COOH)-NHCO-⬡-NH₂ | ⬡(OCH₂COOH)-NH₂ | ⬡(OH)-SO₃H / ⬡-NHCOCH₂COCH₃ | NH-⬡(OH)(SO₃)-NH₂ | Do. |
| 3 | HO-⬡(COOH)-NHCO-⬡-NH₂ | ⬡(OCH₂COOH)-NH₂ | ⬡(OH)-SO₃H / ⬡-NHCOCH₂COCH₃ | NH₂-⬡(OH)(Cl)(SO₃H) | Do. |
| 4 | HO-⬡(COOH)-NHCO-⬡-NH₂ | ⬡(OCH₂COOH)(SO₃H)-NH₂ | ⬡(OH)-SO₃H / N-N=C(CH₃)-C(CH₃)=O ring | NH₂-⬡-COOH | Do. |
| 5 | HO-⬡(COOH)-NHCO-⬡-NH₂ | ⬡(OCH₂COOH)(SO₃H)-NH₂ | ⬡(OH)-SO₃H / N-N=C(CH₃)-C(CH₃)=O ring | NH₂-⬡(COOH)-NHCOOCH₃ | Do. |

*Example 3*

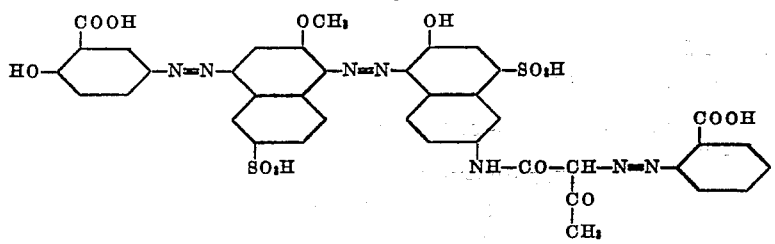

41.7 parts of the aminoazo dyestuff from diazotised 5-amino-2-hydroxybenzene-1-carboxylic acid and 1-amino-2-methoxy naphthalene-6-sulphonic acid are diazotised in the manner described in Example 1 and coupled in the presence of pyridine with 47.1 parts of the yellow monoazo dyestuff from 2-aminobenzene-1-carboxylic acid and 2- acetoacetylamino-6-hydroxynaphthalene-8-sulphonic acid. A trisazo dyestuff is obtained which dyes cellulose fibres a pure green shade. The wet- and light-fastness properties are considerably increased by after-treatment with copper salt solutions.

If in this example, the 2-acetoacetylamino-6-hydroxynaphthalene-8-sulphonic acid is replaced by 1-(6'-hydroxy-8'-sulphonaphthyl-2')-3-methyl-5-pyrazolone and otherwise the same procedure is followed, then a dyestuff is obtained which also dyes cotton in green shades which have similar fastness properties.

Example 4

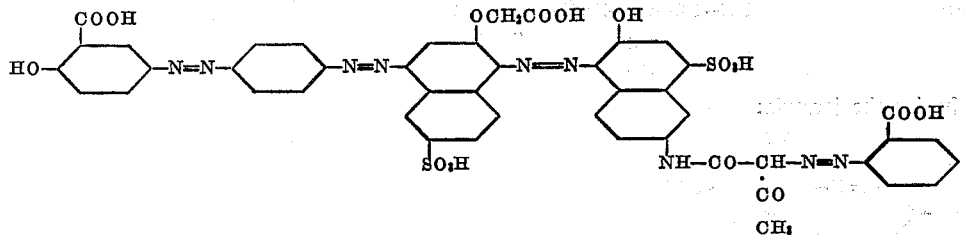

The amino disazo dyestuff from the diazo compound of 25.7 parts of 4'-amino-4-hydroxy-1.1'-azobenzene-3-carboxylic acid and 1-amino-2-carboxymethoxy naphthalene-6-sulphonic acid is diazotised in the same manner as described in Example 1 and coupled in the presence of pyridine with 47.1 parts of the yellow monoazo dyestuff from 2-aminobenzene-1-carboxylic acid and 2-acetoacetylamino-6-hydroxynaphthalene-8-sulphonic acid. The isolated tetrakisazo dyestuff dyes cellulose material in olive shades which, on after treatment with copper salts, have very good fastness to washing and light.

If, instead of 1-amino-2-carboxymethoxy naphthalene-6-sulphonic acid, 1-amino-2-methoxy naphthalene-6-sulphonic acid is used, then a similar dyestuff is obtained.

Example 5

2 parts of the dyestuff obtained according to Example 1 are dissolved in a dyebath containing 3000 parts of water and 1 part of sodium carbonate. 100 parts of cotton are entered at 40–50°, the bath is heated within 30 minutes to 90–95°, 30 parts of sodium sulphate are added and dyeing is continued for 45 minutes at this temperature. After this time, the dye goods are rinsed cold in the usual way and dried. In this manner the cotton is dyed in olive green shades which have good wet fastness properties and excellent fastness to light.

If a dyestuff as obtained according to Examples 2, 3 or 4 is used for dyeing, then, after rinsing, the dyed cotton is after treated in a fresh bath with 2 parts of copper sulphate and 2 parts of acetic acid for 30 minutes at 70°. The goods are then rinsed cold and dried. In this way, the wet- and light-fastness properties of these dyeings are considerably increased.

What I claim is:

1. A polyazo dyestuff having the general formula:

$$A-N=N-B-N=N-D-N=N-E$$

wherein:
A represents the radical of a diazo component of the benzene series,
B represents the radical of a middle component selected from the group consisting of 3-methoxy-1.4-phenylene, 3-carboxymethoxy-1.4-phenylene, 3-methoxy-1.4-naphthylene and 3-carboxymethoxy-1.4-naphthylene radicals,
D represents the radical of a naphtholic component selected from the group consisting of acetoacetylamino hydroxynaphthalene and 3-methyl-5-pyrazolonyl-(1)-hydroxynaphthalene radicals bound to the second azo group in o-position to the hydroxyl group and to the third azo group in the adjacent position to the enolisable keto group,
E represents the radical of a diazo component selected from the group consisting of o-hydroxybenzene and o-carboxybenzene radicals, said polyazo dyestuff possessing at least one sulphonic acid group.

2. A polyazodyestuff having the formula:

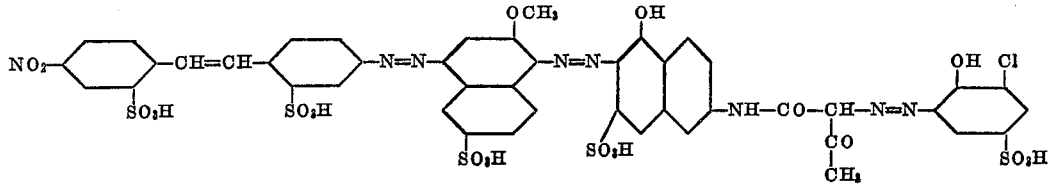

3. A polyazo dyestuff having the formula:

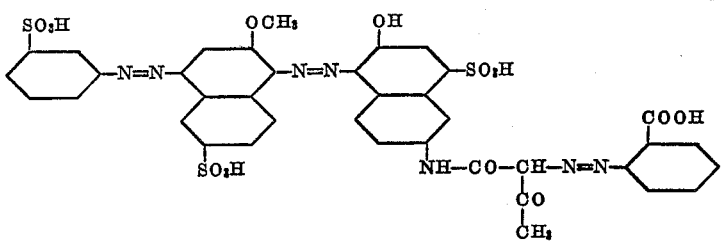

4. A polyazo dyestuff having the formula:

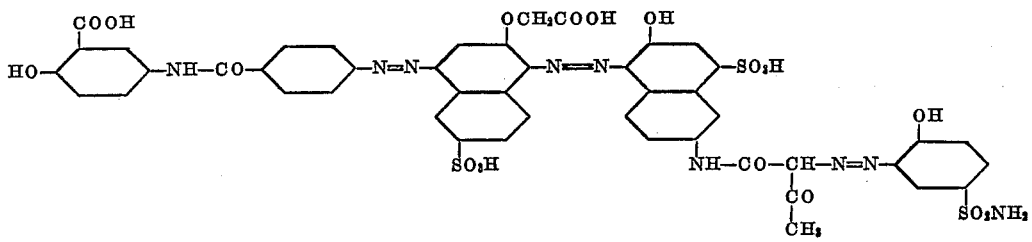

5. A polyazo dyestuff having the formula:
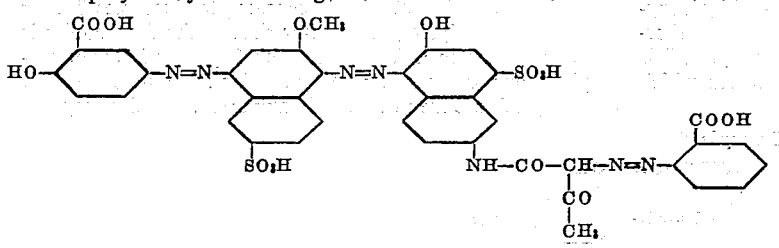
6. A polyazo dyestuff having the formula:
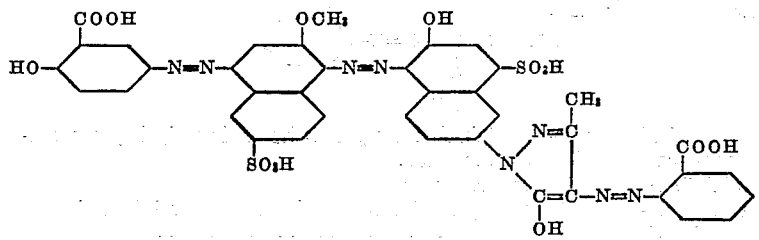
No references cited.